United States Patent

[11] 3,588,008

| [72] | Inventor | Howard John Wyman<br>Coventry, England |
| [21] | Appl. No. | 799,042 |
| [22] | Filed | Feb. 13, 1969 |
| [45] | Patented | June 28, 1971 |
| [73] | Assignee | Rootes Motors Limited<br>London, England |
| [32] | Priority | Feb. 16, 1968 |
| [33] | | Great Britain |
| [31] | | 7824/68 |

[54] MOUNTING MEMBERS
1 Claim, 6 Drawing Figs.

[52] U.S. Cl. ..................................................... 248/15,
180/64, 267/153
[51] Int. Cl. ..................................................... B60k 9/00
[50] Field of Search ........................................... 248/21, 15,
10, 9, 24, 22, 18; 180/64; 267/152—153, 63, 57.1

[56] References Cited
UNITED STATES PATENTS
2,224,648 12/1940 Haadem ...................... 248/21

| 2,280,090 | 4/1942 | Humphreys ................. | 248/15X |
| 2,675,202 | 4/1954 | Kaemmerling ............... | 248/10X |
| 2,723,538 | 11/1955 | Heidorn et al. ............... | 248/21X |
| | | FOREIGN PATENTS | |
| 76,556 | 10/1961 | France ......................... | 248/9 |
| 503,466 | 9/1952 | Italy ............................ | 267/1 |

Primary Examiner—Edward C. Allen
Assistant Examiner—J. Franklin Foss
Attorney—Mawhinney and Mawhinney ABSTRACT: A mounting member for supporting a transmission unit in a vehicle body comprising a rectangular metal plate having spaced holes for receiving bolts and having a central rectangular aperture formed by cutting and bending tongues from opposed ends of the aperture, the plate having a rubber covering bonded on opposite faces thereof, said cover surrounding the bolt holes and also providing thick rubber cushions on the faces of the tongues for supporting the transmission unit.

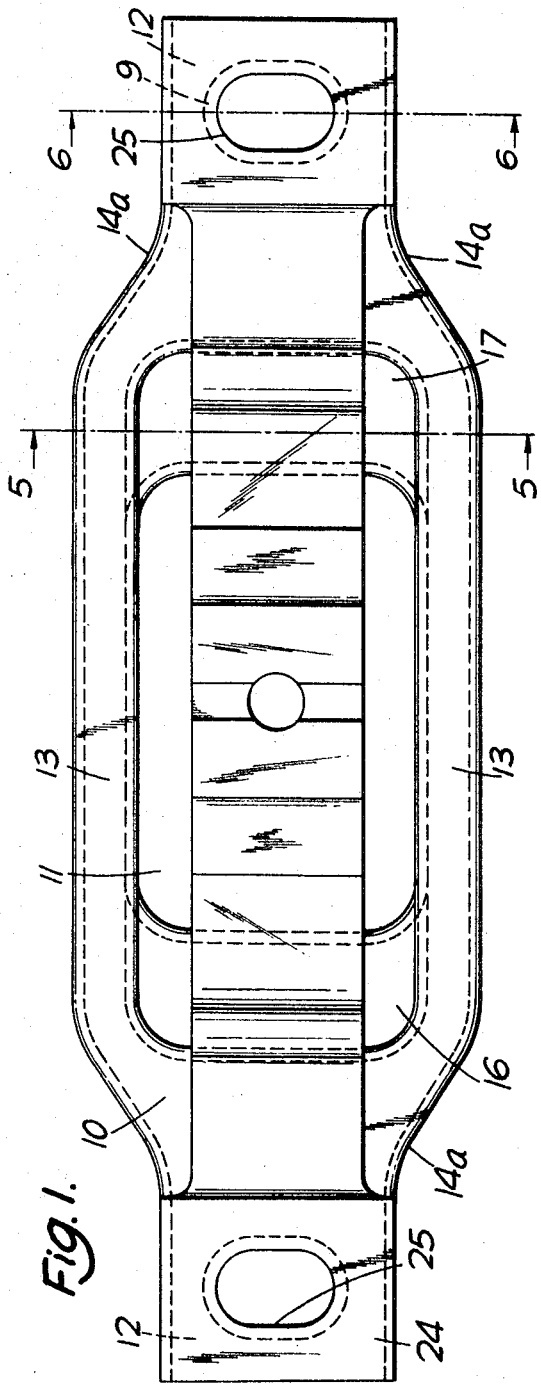
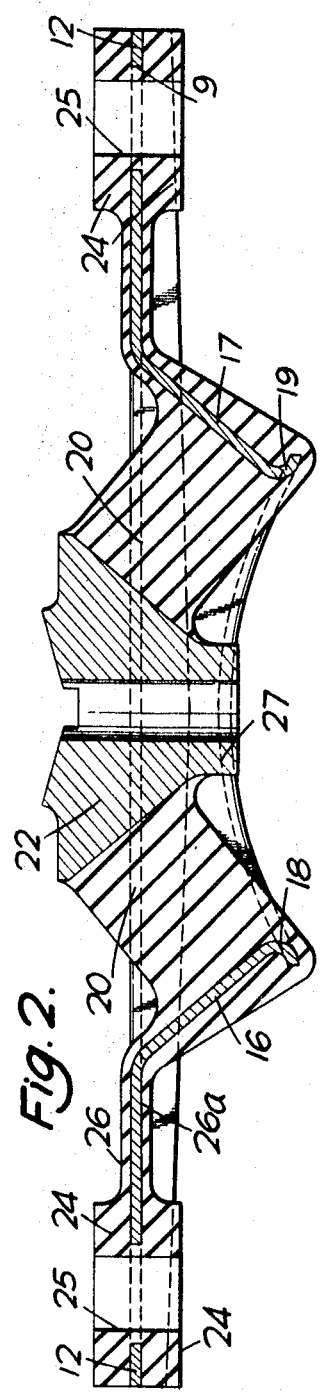

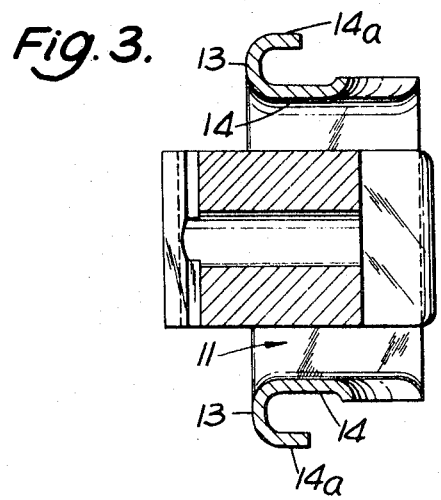
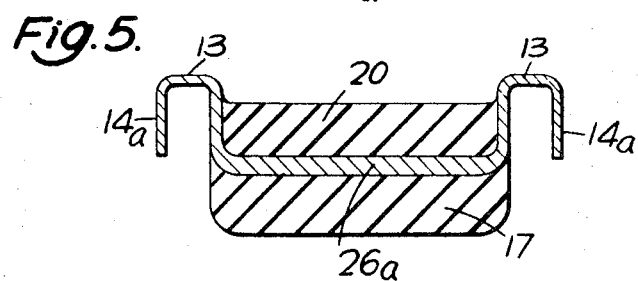
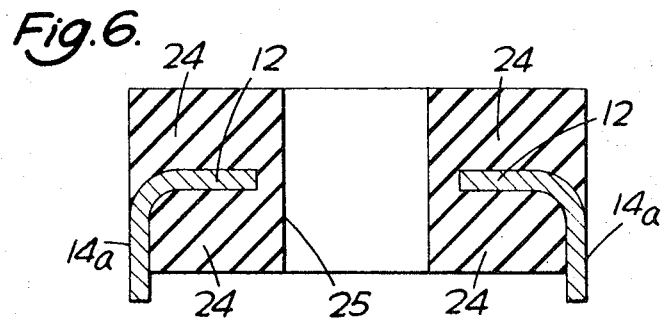

MOUNTING MEMBERS

This invention relates to mounting members and is particularly, although not exclusively, applicable to mounting members for supporting the rear end of an engine-transmission unit. An engine-transmission unit is normally carried on a transverse member insulated from the vehicle body by rubber washers to attenuate transmitted vibrations into the vehicle body. It will be appreciated that assembly of such components is a tedious matter and that misassembly of the components could result in metal-to-metal contact. The invention seeks to provide a mounting member which overcomes these assembly problems.

The invention provides a mounting member comprising a rigid plate having an opening or openings for receiving means for securing the plate to a support, which opening or openings are encircled on both sides of the plate by cushions of resiliently deformable material bonded to the plate, and the plate having a further cushion or cushions of resiliently deformable material bonded to the plate for supporting a load.

Preferably the cushions encircling the openings are integrally connected by further resiliently deformable material to the cushion or cushions for supporting the load.

The plate may have a centrally located opening and may be formed on opposed sides of the opening and to one side of the plate with tongues which are inclined to the general plane of the plate to which tongues the cushions for supporting the load are bonded.

The cushions bonded to said inclined tongues may be block shaped.

In any of the above arrangements the resiliently deformable material may be rubber.

In one embodiment of the invention the mounting member may comprise a metal plate of generally rectangular outline having holes for fixing bolts adjacent opposite ends of the plate, and having a central rectangular aperture formed by cutting two opposed tongues extending lengthwise of the plate and bending the tongues to lie obliquely to the plane of the plate on one side thereof, and also comprising a rubber covering bonded to the plate on opposite faces thereof, said cover surrounding the bolt holes and also providing thick rubber cushions on the faces of the tongues opposed to one another, said cushions having opposed faces oblique to the plane of the plate in parallel relation of the tongues and further comprising an anchor member bonded to the said opposed faces of the cushions.

The following is a description of one embodiment of the invention reference being made to the accompanying drawings in which:

FIG. 1 is a plan view of a mounting member for mounting an engine transmission in a vehicle body, FIG. 2 is a section on the line 2–2 of FIG. 1, FIG. 3 is a section on the line 3–3 of FIG. 1;

FIG. 5 is a section on the line 5–5 of FIG. 1, and

FIG. 6 is a diagrammatic view of a transmission casing showing the mounting member secured to the casing.

Figure 4:
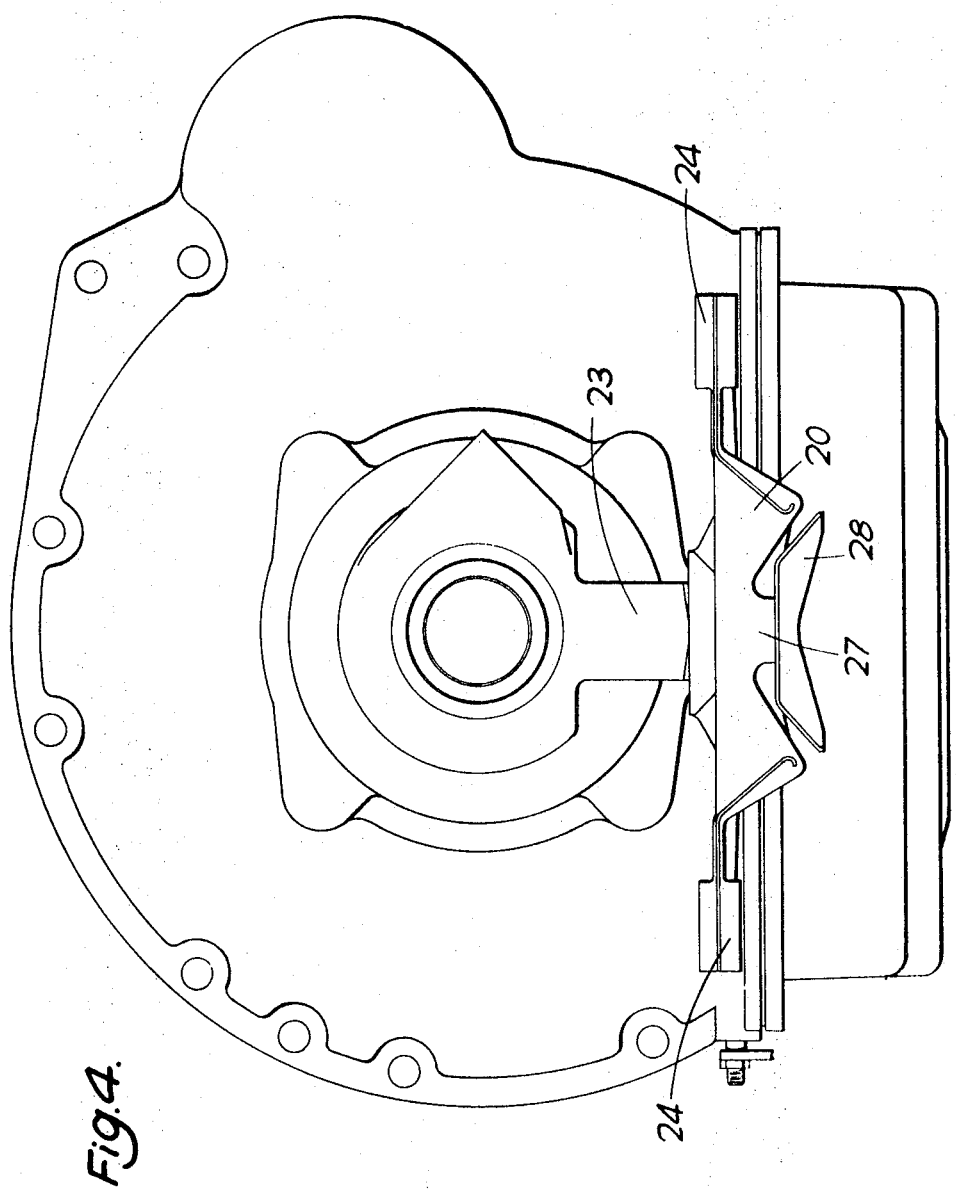
FIG. 4 is a section on the line 4–4 of FIG. 1.

The mounting member comprises a generally rectangular rigid plate 10 having a central rectangular opening indicated at 11. At opposed ends of the plate, lugs 12 are formed having slots 9 therein for receiving bolts (not shown) for securing the plate 10 to the vehicle body. As best seen in FIG. 3 the parts of the plate on either side of the opening 11 indicated by the reference numeral 13 are formed with flanges 14 extending normally to the plane of the plate to increase the stiffness of the plate. The side edges of the plate are also formed with flanges 14a extending normally to the plane of the plate.

At opposed ends of the central opening 11 the flanges 14 merge with inclined tongues 16, 17 (see FIG. 2) which tongues extend downwardly from the general plane of the plate. The lower ends of the tongues 16, 17 are formed with bent over lips 18, 19 respectively. Bonded to the upper surfaces of the tongues 16, 17 are generally rectangular section rubber blocks 20, to the inclined upper surfaces of which a V-shaped base part 22 of a transmission casing 23 is bonded (see FIG. 6).

Bonded to the upper and lower surfaces of the lugs 12 at the ends of the plate are cushions 24 of rubber. The cushions 24 are connected together by annular parts 24a extending through the slots 9 in the lugs 12 and which parts 24a have openings 25 for receiving the aforesaid bolts for securing the plate to the vehicle body. It will be appreciated that the cushions 24 and parts 24a minimize the transmission of vibration between the bolts and plate by preventing direct engagement of the bolts with the plate. At each end of the plate the cushions 24 on the upper and lower surfaces of the lug 12 are connected to the block 20 adjacent the cushions by connecting strips 26 and 26a which are bonded to the upper and lower surfaces of the plate between the cushions and the block respectively.

As shown in FIG. 6 the mounting member supports a V-shaped base part 22 of a transmission casing 23. A central boss 27 on the base part 22 extends below the inclined faces on the rubber blocks which support the base part 22 and secured to the underface of the boss 27 is a plate 28 which extends on either side of the boss 27 and underlies the blocks 20. The plate 28 is normally spaced below the blocks 20 but upward movement of the transmission casing and the base part brings the plate into engagement with the blocks which resist further upward movement of the transmission casing.

I claim:

1. A mounting member comprising an elongated metal plate having two slots located adjacent opposite ends of the plate for receiving means for securing the plate to a support and a central rectangular aperture extending lengthwise of the plate, a flange on the plate extending around the aperture to one side of the plate the flange having two portions adjacent the two ends of the apertures which flange portions are inclined obliquely to the plate and extend part way across the aperture, two resilient blocks bonded to the obliquely extending flange portions on the sides thereof adjacent the plate, the blocks having side faces which are spaced from portions of said flange extending along the sides of the rectangular aperture, an anchor member bonded to the adjacent faces of the blocks for attachment to a load to be supported and resilient cushions bonded to both sides of the plate around the two slots and extending through the slots, whereby the securing means located in the slots are insulated from the plate.